US012473075B2

(12) United States Patent
Kang et al.

(10) Patent No.: US 12,473,075 B2
(45) Date of Patent: Nov. 18, 2025

(54) AIRCRAFT CONTROL INPUT DEVICE AND COMMAND INPUT METHOD USING THE SAME (71) Applicant: Korea Aerospace Research Institute, Daejeon (KR)

(72) Inventors: Youngshin Kang, Daejeon (KR); Bumjin Park, Daejeon (KR); Seongwook Choi, Daejeon (KR); Yushin Kim, Seoul (KR); Jongmin Bae, Sejong-si (KR); Joowon Choi, Daejeon (KR); Sungho Chang, Sejong-si (KR)

(73) Assignee: Korea Aerospace Research Institute, Daejeon (KR)

( * ) Notice: Subject to any disclaimer, the term of this patent is extended or adjusted under 35 U.S.C. 154(b) by 419 days.

(21) Appl. No.: 18/061,042

(22) Filed: Dec. 2, 2022

(65) Prior Publication Data
US 2023/0286645 A1 Sep. 14, 2023

(30) Foreign Application Priority Data

Dec. 2, 2021 (KR) .................. 10-2021-0170628
Sep. 21, 2022 (KR) .................. 10-2022-0119588

(51) Int. Cl.
*B64C 13/04* (2006.01)
*B64D 43/00* (2006.01)
(Continued)

(52) U.S. Cl.
CPC .......... *B64C 13/0421* (2018.01); *B64D 43/00* (2013.01); *B64C 29/0008* (2013.01); *G05G 2009/04774* (2013.01)

(58) Field of Classification Search
CPC ......... B64C 27/56; B64C 27/57; B64C 13/18; B64C 25/42; B64C 13/0421;
(Continued)

(56) References Cited

U.S. PATENT DOCUMENTS 9,994,303 B2 * 6/2018 Scacchi ............... B64C 13/0421
11,809,203 B2 * 11/2023 Kang ..................... B64U 20/83
(Continued)

FOREIGN PATENT DOCUMENTS

EP 3015148 A1 * 5/2016 ............. A63H 27/02
EP 3670334 A1 6/2020
(Continued)

OTHER PUBLICATIONS

Sturman, David Joel. "Whole-hand input." PhD diss., Massachusetts Institute of Technology, (Year: 1992). (Year: 1992).*
(Continued)

*Primary Examiner* — Cuong H Nguyen
(74) *Attorney, Agent, or Firm* — Blank Rome LLP (57) ABSTRACT The present invention relates to a control input device applicable to an eVTOL aircraft, which is an electric-powered vertical take-off and landing aircraft, and more particularly, to an aircraft control input device that may replace a cyclic control stick, a tail rotor control pedal, and a collective control stick used for flight control of a conventional aircraft, which is simpler in configuration and easier to operate than conventional control devices and may improve pilot convenience and stability of flight operation through simple and accurate flight manipulation, and a command input method using the same.

9 Claims, 5 Drawing Sheets (51) Int. Cl.
  *G05G 9/047*   (2006.01)
  *B64C 29/00*   (2006.01)

(58) Field of Classification Search
  CPC ..... B64C 29/0008; B64C 27/80; B64D 43/00; G05D 1/102
  USPC .......................................... 74/479.01, 480 R
  See application file for complete search history.

(56) References Cited

U.S. PATENT DOCUMENTS

| | | | | |
|---|---|---|---|---|
| 11,940,816 | B2* | 3/2024 | English | B64C 13/0421 |
| 2009/0187292 | A1 | 7/2009 | Hreha et al. | |
| 2016/0185448 | A1* | 6/2016 | Scacchi | B64C 13/22 244/197 |
| 2017/0217584 | A1* | 8/2017 | Elfeky | B64C 27/56 |
| 2017/0329349 | A1* | 11/2017 | Greenfield | B64C 13/0421 |
| 2020/0278701 | A1* | 9/2020 | Kang | B64U 10/20 |
| 2021/0294355 | A1* | 9/2021 | English | G05D 1/652 |
| 2021/0380223 | A1* | 12/2021 | English | G05D 1/0016 |

FOREIGN PATENT DOCUMENTS

| | | | | | |
|---|---|---|---|---|---|
| JP | 2015112929 | A | * | 6/2015 | ............ B64C 27/08 |
| KR | 2023083211 | A | * | 6/2023 | ......... B64C 13/0421 |
| KR | 20230083211 | A | * | 6/2023 | ......... B64C 13/0421 |

OTHER PUBLICATIONS

Owens, Bruce, David Cox, and Eugene Morelli. "Development of a low-cost sub-scale aircraft for flight research: The FASER project." 25th AIAA Aerodynamic Measurement Technology and Ground Testing Conference.. (Year: 2006).*

Chin, Diana D., et al. "Inspiration for wing design: how forelimb specialization enables active flight in modern vertebrates." Journal of the Royal Society Interface 14.131 20170240 (Year:2017).*

Barbarino, Silvestro, et al. "A review on shape memory alloys with applications to morphing aircraft." Smart materials and structures 23.6: 063001 (Year:2014). (Year: 2014).*

An English-translated version of EP3015148A1 by Wang et al about Control device, control system, and control method of aircraft (Year: 2017).*

Feary, Michael S., et al. "Evaluation of novel eVTOL aircraft automation concepts." AIAA Aviation Forum and Exposition. 2023. (Year: 2023).*

Altamirano, George, et al. "Flying qualities analysis and piloted simulation testing of a lift+ cruise vehicle with propulsion failures in hover and low-speed conditions." Vertical Flight Society's 79th Annual Forum & Technology Display. 2023. (Year: 2023).*

Chang, Christopher Thomas. Handling Qualities of a Regional-Class Hybrid Wing Body Aircraft. MS thesis. University of Toronto (Canada), 2023. (Year: 2023).*

Ovcharenko, S. I., S. V. Filipkovskyi, and S. S. Shaabdiiev. "Aircraft systems and equipment." (2022). (Year: 2022).*

* cited by examiner

AIRCRAFT CONTROL INPUT DEVICE AND COMMAND INPUT METHOD USING THE SAME

CROSS-REFERENCE TO RELATED APPLICATIONS

This application claims priority under 35 U.S.C. § 119 to Korean Patent Application No. 10-2021-0170628, filed on Dec. 2, 2021, and Korean Patent Application No. 10-2022-0119588, filed on Sep. 21, 2022, in the Korean Intellectual Property Office, the disclosure of which is incorporated herein by reference in its entirety.

TECHNICAL FIELD

The following disclosure relates to a device for controlling an aircraft having an automatic flight control device, and a control input device for controlling an aircraft or inputting input values to be input to an automatic flight control using a single stick, and a command input method using it.

BACKGROUND

Figure 1:
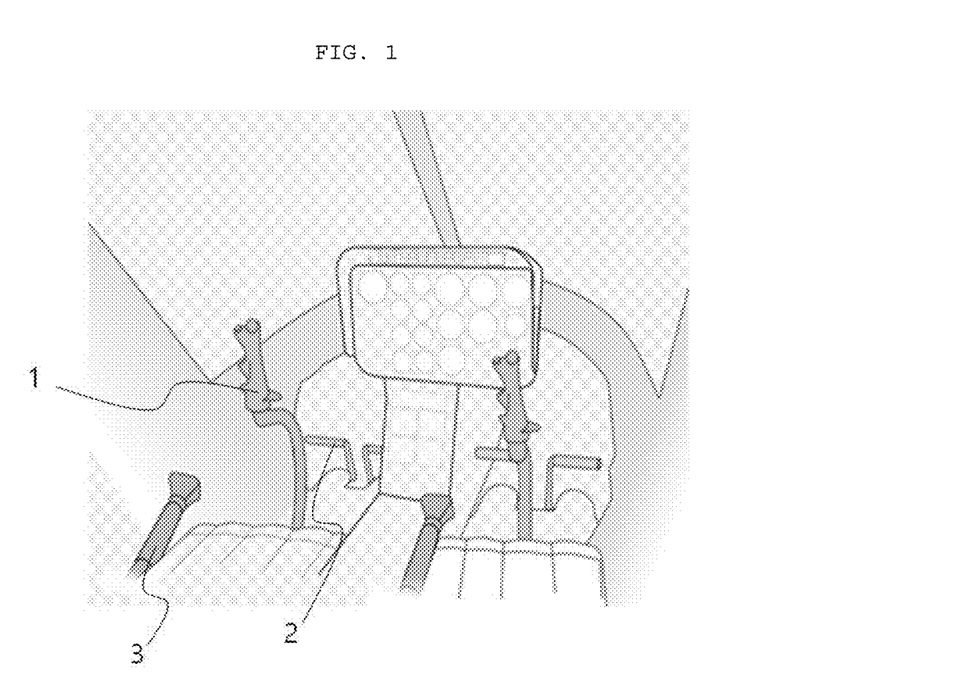
FIG. 1 shows a conventional helicopter control stick.

Referring to FIG. 1, a control input device of a helicopter, which is a general vertical take-off and landing aircraft, is described. Helicopters include a control input device including a cyclic control stick 1 for controlling a pitch and roll attitude, a tail rotor control pedal 2 for controlling a direction, and a collective control stick 3 for inputting an engine thrust and a collective pitch angle of the rotor blades. Meanwhile, a fixed-wing aircraft is configured such that when both sides of the tail rotor control pedal 2 are stepped on at the same time, a brake function operates.

Because flight control using cyclic control sticks, pedals, and collective control sticks of these helicopters is mostly performed manually, pilots need a lot of training time and high-level control skills to master a helicopter control.

In the related art case, an automatic flight control system (autopilot) of a manned aircraft or a ground control system of an unmanned aircraft is provided with an automatic system that automatically maintains constant altitude, speed, heading, etc. to reduce the pilot's control burden, and is configured to input an input value through a knob input device. In general, the knob input device of the manned aircraft may be located on a control instrument panel separate from the control stick input device and is provided to input a target altitude, speed and heading commands by turning a knob dial or applying a beep trim button of the control stick after pressing altitude (ALT), speed (IAS) and heading (HDG) buttons. In addition, in the case of an unmanned aerial vehicle, altitude, speed, and heading commands may be input using a knob window and a dial input device of the ground control system (GCS).

In the case of an electric-powered vertical take-off and landing (eVTOL) personal aircraft, flight control may be performed by an ordinary person with a level of flight experience and control skills that are much less than those of a professional pilot. To this end, most of the flight control should be performed automatically, and manual control of an occupant is required only in emergencies, such as failure situations, but an autopilot allowing for a safe landing without a very high level of control skills should be provided.

Accordingly, there is a need for a control input device allowing a pilot who is an ordinary person to easily operate the flight control.

SUMMARY

An exemplary embodiment of the present invention is directed to providing a device capable of performing flight control using a single control device to simplify and facilitate a flight operation, compared with an existing control device, and easily inputting a control command through a control device, so as to be used in an electric vertical take-off and landing personal aircraft having an automatic flight control system.

In one general aspect, a control input device for inputting a control command for at least one operation of pitch attitude, roll attitude, direction control, engine thrust, blade pitch angle, wireless communication, and brake of aircraft to control the aircraft, includes: a body portion formed in a bar shape grippable by hand and inputting the control command through an operation of pushing or pulling in every direction and a twisting operation in an axial direction; and at least one position input device formed in the body portion to input the control command by a manipulation operation.

The body portion may input a control command for the pitch attitude of the aircraft through the operation of pushing or pulling in front-rear direction, may input a control command for the roll attitude of the aircraft through the operation of pushing or pulling in left-right direction, and may input a control command for direction control of the aircraft through a clockwise or counterclockwise twisting operation in an axial direction.

The position input devices may include a first position, a second position, and a third position formed in a portion in which a thumb is located in a state in which the body portion is gripped; and a fourth position formed in a portion in which any one of the remaining fingers excluding the thumb is located in a state in which the body portion is gripped.

The first position may operate while moving in an up-down direction, and a control command for a magnitude of an engine thrust of the aircraft may be input through an operation of moving the first position in the up-down direction.

The third position may be formed in the form of a button to be pressed, and a control command for turning on/off wireless voice communication of the aircraft is input through an operation of pressing the third position.

The fourth position may be formed in the form of a button to be pressed, and a brake control command of the aircraft is input through an operation of pressing the fourth position.

The control input device may further include: a monitor showing flight information of the aircraft, wherein the monitor may include a plurality of modules for automatic flight control to be a touch screen that switches to a selected module when a screen is touched for the module.

In another general aspect, in an input method for inputting an altitude speed hold command using the control input device, the altitude speed hold mode of the aircraft is performed by selecting the altitude speed hold mode from the monitor showing flight information of the aircraft and inputting at least any one of an altitude command value and a speed command value by operating the position.

As an altitude command input method using the control input device, the position may include the first position formed in a portion in which the thumb is located in a state in which the body portion is gripped, and operating while moving in an up-down direction, and an altitude command value in a first range is input by manipulating the first position in the altitude speed hold mode.

In an altitude command input method using the control input device, an altitude command value in a second range may be input by pushing or pulling the body portion in a front-rear direction, while manipulating the first position in the up-down direction, and the second range may be a value greater than the first range.

As a speed command input method using the control input device, the position may include a second position formed in a portion in which the thumb is located in a state in which the body portion is gripped, and operating, while moving a position bar up and down and left and right, and in the altitude speed hold mode, a speed command value in the first range may be input by manipulating the second position in the up-down direction.

In the speed command input method using the control input device, a speed command value in a second range may be input by manipulating the second position in the up-down direction and simultaneously pushing or pulling the body portion in a forward-backward direction, and the second range may be a value greater than the first range.

In another general aspect, in an input method for inputting a heading hold command using the control input device, the heading hold mode of the aircraft is performed by selecting the heading hold mode from the monitor showing flight information of the aircraft and inputting a heading command value by manipulating the position.

As a heading command input method using the control input device, the position may include a second position formed in a portion in which the thumb is located in a state in which the body portion is gripped, and operating, while moving a position bar up and down and left and right, and in the heading hold mode, a heading command value in a first range may be input by manipulating the second position in the left-right direction.

In the heading command input method using the control input device, a heading command value in a second range may be input by manipulating the second position in a left-right direction and simultaneously pushing or pulling the body portion in the left-right direction, and the second range may be a value greater than the first range.

In the heading command input method using the control input device, a heading command value in a second range may be input by manipulating the second position in a left-right direction and simultaneously twisting the body portion from side to side, and the second range may be a value greater than the first range.

In another general aspect, in an input method for inputting a roll hold command using the control input device, a roll hold mode of the aircraft is performed by selecting the roll hold mode from the monitor showing flight information of the aircraft and inputting a roll command value by manipulating the position.

As a roll command input method using the control input device, the position may include a second position formed in a portion in which the thumb is located in a state in which the body portion is gripped, and operating, while moving a position bar up and down and left and right, and in the roll hold mode, a roll command value in the first range may be input by manipulating the second position in a left-right direction.

In the roll command input method using the control input device, the roll command value in a second range may be input by manipulating the second position in the left-right direction and simultaneously pushing or pulling the body portion in the left-right direction, and the second range may be a value greater than the first range.

According to the aircraft control input device and the command input method using it of the present invention according to the configuration as described above, unlike the related art in which flight control is performed using a plurality of control sticks in an existing aircraft, flight of an aircraft may be manipulated using one control device, so that even an unskilled pilot may more easily perform flight control, thereby improving work efficiency. In addition, by configuring a command value for automatic flight control to be input using the control device, the number of parts installed in the aircraft may be reduced, and the convenience of manipulation may be improved, thereby achieving an effect of improving the pilot convenience and stability of a flight operation through simple and accurate flight control.

DETAILED DESCRIPTION OF EXEMPLARY EMBODIMENTS

Hereinafter, exemplary embodiments of the present invention will be described in detail with reference to the accompanying drawings. Prior to the description, it should be understood that the term used in the specification and the appended claims should not be construed as limited to general and dictionary meanings, but interpreted based on the meanings and concepts corresponding to technical aspects of the present invention based on the principle that the inventor is allowed to define terms.

Therefore, the description proposed herein is just a preferable example for the purpose of illustration only, and is not intended to limit the scope of the disclosure, so it should be understood that other equivalents and modifications could be made thereto without departing from the spirit and scope of the disclosure.

Hereinafter, technical ideas of the present invention will be described in more detail with reference to the accompanying drawings. However, the accompanying drawings are merely illustrated to describe the technical sprits of the present invention in more detail, and the technical sprits of the present invention are not limited by the accompanying drawings.

Referring to FIG. 1, an aircraft control input device of the related art includes a cyclic control stick 1 for pitch and roll attitude control, a tail rotor control pedal 2 for direction control, and a collective control stick 3 for inputting a collective pitch angle of rotor blades and engine thrust, and the aircraft is configured to perform a corresponding mission by inputting a flight control command by using the plurality of control sticks in combination.

The present invention relates to a control input device that commands an operation for flight control of an aircraft. Unlike the related art, the present invention is configured to input control commands necessary for flight control, such as a pitch attitude, roll attitude, direction control, engine thrust, blade pitch angle, wireless communication and a brake of an aircraft through one control stick. Therefore, even a pilot who is not proficient in controlling an aircraft may perform flight control more easily, and thus, because an ordinary person with a level of flight experience, control skills, and desired pay that is much more modest than those of a professional pilot may perform control, work efficiency may be improved and an effect of contributing to the popularization of vertical take-off and landing personal aircraft as a means of transportation in the future may be achieved. In particular, the control input device of the present invention may be applied to an eVTOL aircraft, which is an electric powered vertical take-off and landing aircraft, and is intended to provide a device capable of performing flight control through the automatic control system and one control input device in an aircraft equipped with an automatic control system.

Figure 2:
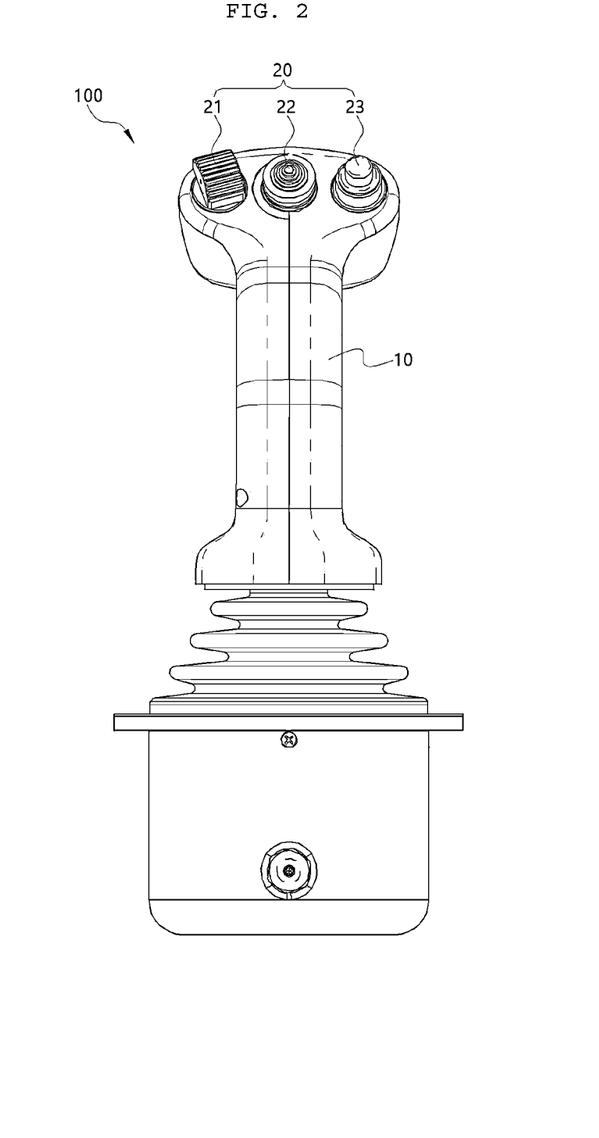
FIG. 2 is a front view of a control input device according to the present invention.
Figure 3:
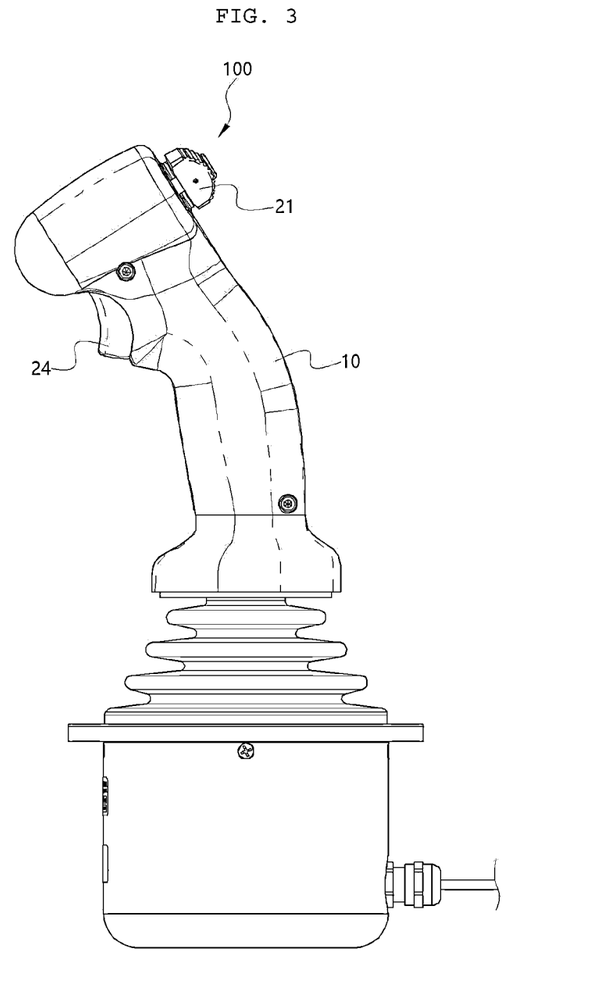
FIG. 3 is a side view of a control input device according to the present invention.
Figure 4:
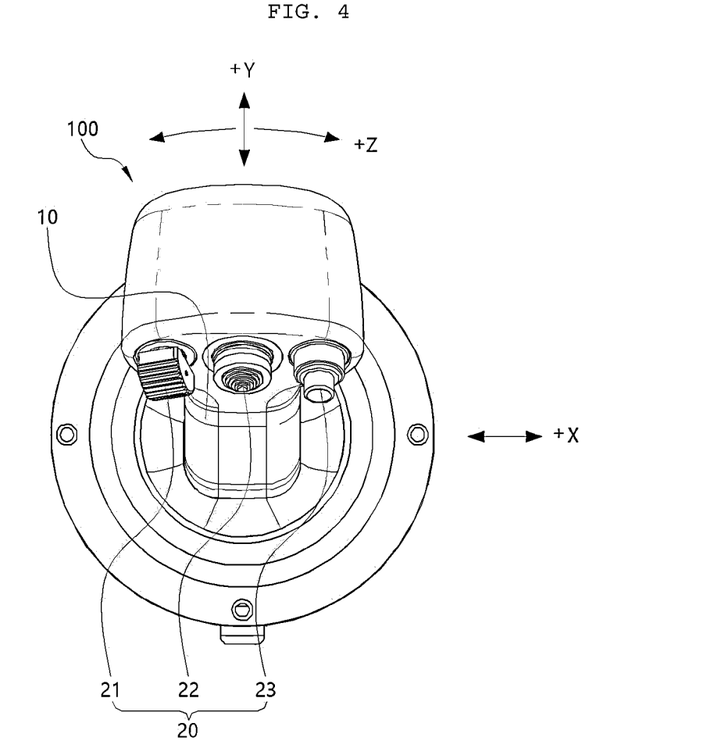
FIG. 4 shows a plane of a control input device according to the present invention.

The present invention relates to a control input device for inputting a control command for an operation of at least one of the pitch attitude, roll attitude, direction control, engine thrust, blade pitch angle, wireless communication, and brake of the aircraft for the control of a distributed propulsion electric-powered vertical take-off and landing aircraft having an automatic flight control device. Therefore, the control input device 100 of the present invention may include a body portion 10 formed in the shape of a bar that may be gripped by hand to input the control command by an operation of pushing or pulling in every direction and a twisting operation in an axial direction and at least one position 21, 22, 23, and 24 formed in the body portion to input the control command by a manipulation operation. In addition, the aircraft of the present invention may include the control input device 100 for inputting an input value for an operation of the aircraft, a flight information monitor (FIM) 200 inputting commands by drawing or touching for a plurality of modules according to the flight information and automatic flight module of the aircraft, and a flight control computer controlling the aircraft according to input values.

The body portion 10 is formed so that a pilot may grip it with any one of a left hand or a right hand to use it, and is formed in a bar shape having a length in one direction so that the pilot may use the bar by holding it with his hand. Referring to FIGS. 1 to 3, the body portion 10 is connected to the aircraft on the other side and extends in one direction, so that one end of the body portion 10 may be gripped by the user. The body portion 10 may be formed to be inclined at a certain angle on one side when extending in a length direction so that the pilot may grip the body portion 10 with his hand and easily use another device provided in the body portion 10 by using his fingers. In an exemplary embodiment of the present invention, the body portion 10 may have a form having an angle inclined toward the front from a central portion to one end in the length direction while the other end is vertically extended.

Referring to FIGS. 1 to 3, the body portion 10 of the present invention may be movable in every direction and may be formed to allow a twisting operation in the axial direction of the body portion 10, and according to a movement or twisting operation of the body portion 10 in each direction, a certain control command may be input to a flight control computer, and the aircraft may perform an operation according to the command. In an exemplary embodiment of the present invention, a control command may be input to the body portion 10 through a pushing or pulling operation in a front-rear direction (Y-axis), and the control command at this time may be set as a control command for the pitch attitude of the aircraft. In addition, a control command may be input to the body portion 10 through a pushing or pulling operation in a left-right direction (X-axis), and the control command at this time may be set as a control command for the roll attitude of the aircraft. In addition, a control command may be input to the body portion 10 through a clockwise or counterclockwise twisting operation (Z axis) in the axial direction, and the control command at this time may be set as a control command for the direction control of the aircraft. For example, when the pilot wants to fly the aircraft to the right, the pilot may grip the body portion 10 with his hand and then push the body portion 10 to the right to input a command for the roll attitude of the aircraft, or may perform flight control by inputting a command so that the aircraft heads in the right direction by twisting the body portion 10 clockwise during stationary flight or low-speed flight.

At least one position is formed on the body portion 10, and a control command is input to the aircraft by a manipulation operation of the position. The position may be provided in plurality according to the user's needs, and each position may be set to input a different command value. The positions 21, 22, 23, and 24 are preferably arranged according to the shape of the body portion 10, and the positions 21, 22 and 23 may be located in a portion where each finger is located when the pilot grips the body portion 10 with his/her hand, or the position 24 may be located in a position that may be controlled using a finger, so that the pilot may easily and conveniently operate the position. The position may be used without limitation as long as it is a device capable of inputting input values to the flight control computer by any operation, and it is preferable to select and provide an appropriate operation according to the user's needs and purposes.

Referring to FIGS. 1 to 3, in an exemplary embodiment of the present invention, in the control input device 100, the pilot may grip the bar portion of the body portion 10 such that all of the fingers excluding the thumb wraps the bar portion and the thumb contacts the other fingers. At this time, the first position 21, the second position 22, and the third position 23 may be formed in a portion in which the pilot's thumb is located in a state where the pilot grips the body portion 10, and the fourth position 24 may be formed at a position of one or more of the fingers other than the pilot's thumb. More specifically, the control input device 100 of the present invention may have four positions 21, 22, 23, and 24, and among the four positions, three positions including the first, second, and third positions 21, 22, and 23 may be located at one end side of the body portion 10, and the remaining one position, which is the fourth position 24, may be located in a length portion of the body portion 10. The first, second, and third positions 21, 22, and 23 may be formed adjacent to each other at one end of the body portion 10, and may be arranged vertically in parallel to each other, but in an exemplary embodiment of the present invention, the first, second, and third positions 21, 22, and 23 are arranged side by side on the left and right of each other. The fourth position 24 may be formed at a position where the index or middle finger of the pilot's four fingers with smooth force control is located, and in an exemplary embodiment of the present invention, the fourth position 24 may be formed in a front direction of the body portion 10.

The respective positions 21, 22, 23, and 24 may input different flight control commands according to operations. The flight control command at this time may include commands, such as engine thrust, wireless communication on/off, and brake.

More specifically, the first position 21 of the present invention may be formed in a form that may be operated in an up-down direction, and the first position 21 may be set to input a control command for the engine thrust of the aircraft when manipulated in the up-down direction. At this time, the first position 21 may be located on the leftmost side of one end of the body portion 10. For example, when the pilot wants to increase thrust, the first position 21 may be manipulated upward using the pilot's thumb to input a higher value of thrust so that the aircraft may fly with a higher value of thrust.

The second position 22 may be formed in the form of a joystick capable of moving the position bar up, down, left, and right, and the second position 22 may be set to input a control command set by the user by moving the position bar of the second position 22. At this time, the second position 22 may be located adjacent to the right side of the the first position 21. The second position 22 may be formed to input a flight control command as needed, but as an exemplary embodiment of the present invention, the second position 22 is set to be used to input a command value for setting in a flight mode to be described later.

In addition, the third position 23 of the present invention may be formed in the form of a button to be pressed, and may be set to input a control command to turn on or off wireless communication by pressing the third position 23. For example, the third position 23 may be a button type in which a button is inserted when pressed once and protrudes to an existing height when the inserted button is pressed again. Accordingly, when the third position 23 protruding with the existing height is pressed once using the pilot's thumb, the wireless communication of the aircraft is commanded to be ON and an operation to be connected to perform wireless communication with the outside may be performed. Alternatively, it may be set to be ON only when the third position 23 is pressed, and OFF when not pressed.

If the aircraft of the present invention is a distributed electric-powered vertical take-off and landing (eVTOL) aircraft, it adopts a wing such as a fixed wing for a long flight, and should be able to slide and land in a fixed wing mode in an emergency, such as when a motor fails. At this time, a brake is required to stop after sliding on the ground. Therefore, the fourth position 24 of the present invention is formed on the front portion of the body portion 10, and may be formed at a position where at least one finger of the pilot's index and middle fingers is located, and is formed in a button type to be pressed, so that the aircraft may be set to input a brake control command through an operation of pressing the fourth position 24. At this time, the fourth position 24 may be formed to be perceived by distinguishing sensitivity of pressing the button type, and may be formed such that the degree of brake use of the aircraft is adjusted according to the pressure with which the pilot presses the fourth position 24. For example, when the pilot needs an emergency braking operation, the fourth position 24 may be pressed hard with a pressure higher than a certain level, and when an input value received by the flight control computer from the fourth position 24 is identified as a pressure equal to or higher than a certain level, the brake may be operated at a certain level or higher to perform the emergency braking operation of the aircraft. Alternatively, it may be programmed in a computer so that a force of the break command is accumulated according to ON or OFF of the switch at the fourth position 24.

In the present invention, when a plurality of automatic flight modes included in an automatic flight control device of the aircraft are executed using the control input device 100 having the above characteristics, a command value necessary for each mode may be input through the control input device 100. Hereinafter, a method of inputting different command values by manipulating the position of the control input device 100 according to each mode will be described in more detail.

Figure 5:
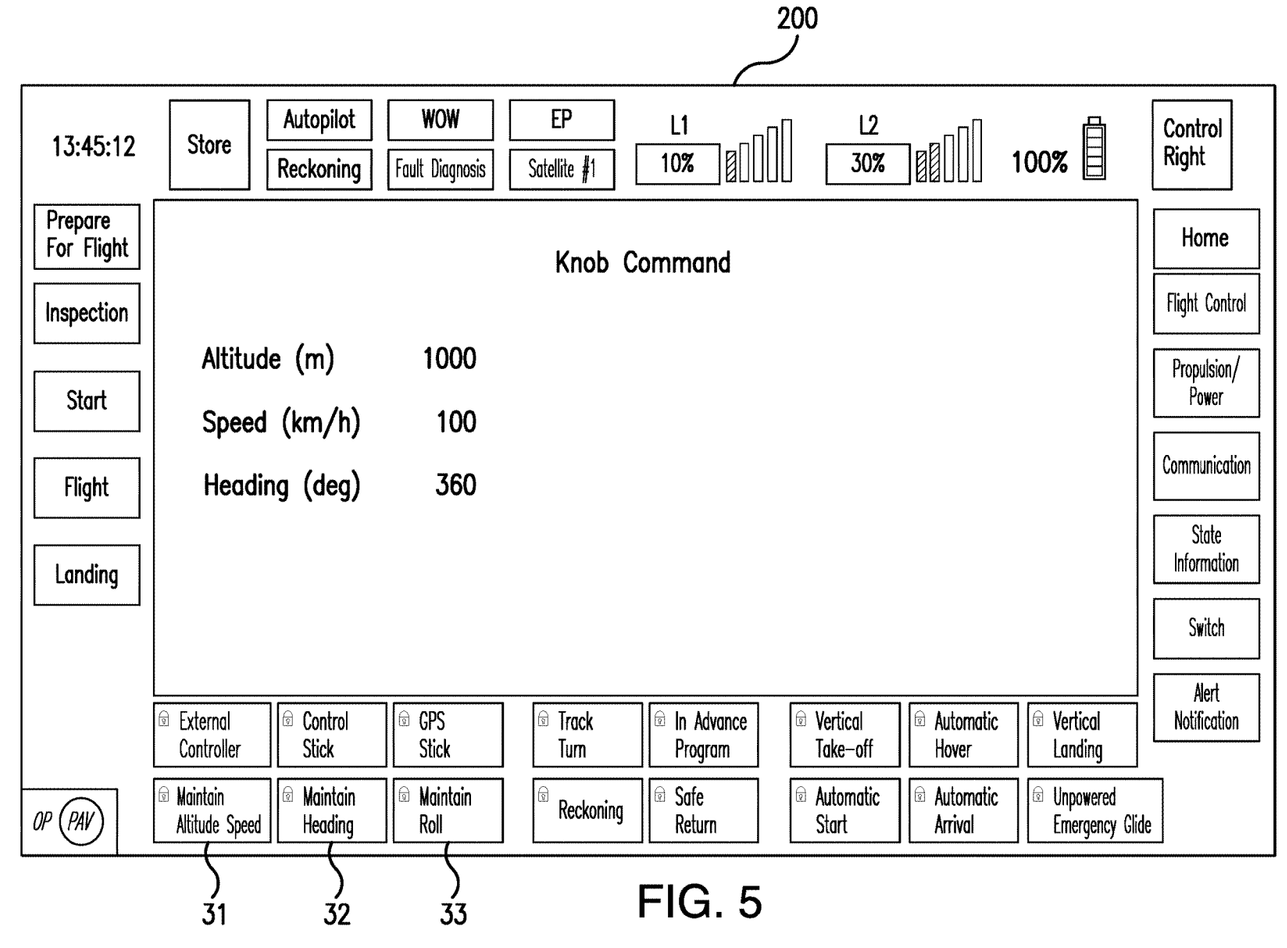
FIG. 5 shows an example of a monitor according to the present invention.

The aircraft of the present invention may include a monitor 200 displaying flight information on a screen so that a pilot may check various information inside the aircraft. In this case, the monitor 200 may check flight information, but may be a touch screen capable of switching a controller to perform a selected mission or mode by touching the screen. Referring to FIG. 5, the monitor 200 may have a plurality of modes formed as buttons on the monitor 200 for automatic flight control, and by touching a button of any mode according to the pilot's need, the flight control computer of the aircraft may be formed to be switched to perform the operation of the corresponding button.

In an exemplary embodiment of the present invention, the aircraft may include an altitude speed hold mode 31 that maintains a constant altitude speed desired by the pilot. Referring to FIG. 5, the altitude speed hold mode 31 may be displayed on the monitor 200 and may be activated by a pilot's touch. When the pilot touches the altitude speed hold mode 31, a screen for inputting an altitude speed hold command including at least one or more of altitude and speed may be executed. At this time, in order to input the altitude speed hold command, the present invention may use a position, and may be configured to input an altitude command value by manipulating the first position 21. The first position 21 of the present invention may be formed to input a command value in a first range by manipulating up and down, and in the altitude input, a high altitude may be input as a command value by manipulating the first position 21 upward. That is, when the pilot presses the altitude speed hold mode button 31 of the monitor 200 to activate the altitude speed hold mode, an altitude command value may be input by manipulating the first position 21 up or down, and according to the input command value, the aircraft may perform the altitude speed hold mode at a corresponding altitude. In addition, in order to input the altitude speed hold command, the present invention may use a position, and may be configured to input a speed command value by manipulating the second position 22. The second position 22 of the present invention may be in the form of a joystick capable of moving up and down, left and right, and may be configured to input a command value by moving the position bar up and down. For example, in a speed input, a high speed may be input as a command value by moving the second position 22 up. That is, when the altitude speed hold mode is activated by the pilot pressing the altitude speed hold mode button 31 of the monitor 200, the speed command value may be input by moving the second position 22 up or down, and according to the input command value, the aircraft may perform the altitude speed hold mode at the corresponding speed. At this time, for the altitude and speed, a reference value that appears first on the monitor 200 may be an altitude and speed of the currently flying aircraft, and other values may be set according to the user's selection. The altitude speed hold mode may be released by the pilot by pressing the altitude speed hold mode button 31 of the monitor 200 once again, and according to the user's setting, the altitude speed hold mode may be set to be performed only for a certain period of time and released after a certain period of time.

In addition, in the altitude speed hold mode 31, the altitude command value may be input by simultaneously manipulating the body portion 10 together with the first position 21, and the speed command value may be input by simultaneously manipulating the body portion 10 together with the second position 22. More specifically, as an altitude input method, an altitude command value in a second range may be input by pushing or pulling the body portion 10 forward and backward while operating the first position 21 in the up-down direction. At this time, the command value in the second range that may be input by simultaneously manipulating the first position 21 and the body portion 10 may be greater than the command value in the first range that may be input by manipulating only the first position 21.

For example, when only the first position 21 is pushed up, a single click may increase an altitude command of 1 m, and when the first position 21 and the body portion 10 are simultaneously pushed or pulled in the front-rear direction, an altitude command by 10 m may be increased. In addition, as a speed input method, a speed command value in the second range may be input by pushing or pulling the body portion 10 in the front-rear direction, while operating the second position 22 in the up-down direction. At this time, the command value in the second range that may be input by simultaneously manipulating the second position 22 and the body portion 10 may be greater than the command value in the first range that may be input by manipulating only the second position 22. For example, when only the second position 22 is pushed upward, a speed command of 1 km/h may be increased with a single click, and a speed command of 10 km/h may be increased by simultaneously pushing the second position 22 and the body portion 10 in the front-rear direction.

In an exemplary embodiment of the invention, the aircraft may include a heading hold mode 32 that constantly maintains a heading desired by the pilot. Referring to FIG. 5, the heading hold mode 32 is displayed on the monitor 200 and may be activated by a pilot's touch. When the pilot touches the heading hold mode 32, a screen for inputting a heading hold command may be executed. At this time, in order to input the heading hold command, the present invention may use a position, and a heading command value in a first range may be input by manipulating the second position 22 in the left-right direction. The second position 22 of the present invention may be in the form of a joystick in which the position bar may move up and down, and left and right, and a command value may be input by moving the position bar in the left-right direction. For example, in inputting a heading command value, a high heading value may be input as a command value by moving the second position 22 to the right. That is, when the pilot activates the heading hold mode by pressing the heading hold mode button 32 of the monitor 200, a heading command value may be input by moving the second position 22 to the left or right, and according to the received command value, the aircraft may perform the heading hold mode. In this case, a reference value that appears first on the monitor 200 for the heading value may be a heading value of the currently flying aircraft, and other values may be set according to the user's selection. The heading hold mode may be released by the pilot by pressing the header hold mode button 32 of the monitor 200 once again, and according to the user's setting, the heading hold mode may be set to be performed only for a certain period of time and may be released after the lapse of a certain period of time.

In addition, in the heading hold mode 32, a heading command value may be input by simultaneously manipulating the body portion 10 together with the second position 22. More specifically, as a heading input method, a heading command value in the second range may be input by pushing or pulling the body portion 10 in the left-right direction, while operating the second position 22 in the left-right direction. Alternatively, as a heading input method, a heading command value in the second range may be input by twisting the body portion 10 in the left-right direction, while manipulating the second position 22 in the left-right direction. At this time, the command value in the second range that may be input by simultaneously manipulating the second position 22 and the body portion 10 may be greater than the command value in the first range that may be input by manipulating only the second position 22.

For example, when only the second position 22 is pushed to the right, a single click may increase a heading command or roll by 1 degree, and a heading command or roll command may be increased by 10 degrees when the second position 22 and the body portion 10 are simultaneously pulled to the right. Alternatively, when the second position 22 and the body portion 10 are twisted to the right at the same time, the heading command or roll command may be increased by 10 degrees.

In an exemplary embodiment of the present invention, the aircraft may include a roll hold mode 33 whereby the pilot constantly maintains a desired roll attitude. Referring to FIG. 5, the roll hold mode 33 is displayed on the monitor 200 and may be activated by a pilot's touch. When the pilot touches the roll hold mode 33, a screen for inputting a roll hold command may be executed. At this time, in order to input the roll hold command, the present invention may use a position, and by manipulating the second position 22, a roll attitude command value in a first range may be input. The second position 22 of the present invention may be in the form of a joystick in which the position bar may move up and down, left and right, and a command value may be input by moving the position bar in the left-right direction. For example, in the roll attitude command value input, a high roll attitude value may be input as a command value by moving the second position 22 to the right. That is, when the pilot activates the roll hold mode by pressing the roll hold mode button 33 of the monitor 200, the roll attitude command value may be input by moving the second position 22 to the left or right, and according to the input command value, the aircraft may perform the roll hold mode. At this time, a reference value first displayed on the monitor 200 for the roll attitude command value may be a roll attitude value of the currently flying aircraft, and other values may be set according to the user's selection. The roll hold mode may be released by the pilot by pressing the roll hold mode button 33 of the monitor 200 once again, and the roll hold mode may be set to be performed only for a certain period of time and may be released after the certain period of time according to the user's setting. In addition, when the heading hold mode button 32 is pressed while the roll hold mode is applied, the roll hold mode may be switched to the heading hold mode, and conversely, when the roll hold mode button 33 is pressed in a state in which the heading hold mode is applied, the heading hold mode may be switched to the roll hold mode.

In addition, in the roll hold mode 32, a roll command value may be input by simultaneously manipulating the body portion 10 together with the second position 22. More specifically, as a roll input method, a roll command value in the second range may be input by pushing or pulling the body portion 10 in the left-right direction, while operating the second position 21 in the left-right direction. At this time, the command value in the second range that may be input by simultaneously manipulating the second position 22 and the body portion 10 may be greater than the command value in the first range that may be input by manipulating only the second position 22.

Hereinabove, although the present invention has been described by specific matters, such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

DETAILED DESCRIPTION OF MAIN ELEMENTS

100: control input device
10: body portion
21: first position
22: second position
23: third position
24: fourth position
200: monitor
31: altitude speed hold mode button
32: heading hold mode button
33: roll hold mode button

What is claimed is:

1. A control input device for inputting a control command for at least one operation of pitch attitude, roll attitude, direction control, engine thrust, blade pitch angle, wireless communication, and brake of an aircraft to control the aircraft, the control input device comprising:
    a body portion formed in a bar shape that is grippable by hand and that inputs the control command through an operation of pushing or pulling the body portion and an operation of twisting the body portion in an axial direction; and
    at least one position formed in the body portion to input the control command by a manipulation operation,
    wherein the body portion inputs:
        a control command for the pitch attitude of the aircraft through the operation of pushing or pulling the body portion in a front-rear direction,
        a control command for the roll attitude of the aircraft through the operation of pushing or pulling the body portion in a left-right direction, and
        a control command for direction control of the aircraft through a clockwise or counterclockwise twisting of the body portion in the axial direction,
    wherein the position comprises:
        a first position, a second position, and a third position formed in a portion in which a thumb is located when the body portion is gripped; and
        a fourth position formed in a portion in which any one of the remaining fingers excluding the thumb is located when the body portion is gripped,
    wherein the first position operates while moving in an up-down direction, and a control command for a magnitude of an engine thrust of the aircraft is input through an operation of moving the first position in the up-down direction,
    wherein the third position is formed in the form of a button to be pressed, and a control command for turning on/off wireless voice communication of the aircraft is input through an operation of pressing the third position, and
    wherein the fourth position is formed in the form of another button to be pressed, and a brake control command of the aircraft is input through an operation of pressing the fourth position.

2. A command input method using a control input device, as an input method for inputting a roll hold command using the control input device of claim 1, wherein:
    a roll hold mode of the aircraft is performed by selecting the roll hold mode from a monitor showing flight information of the aircraft and inputting a roll command value by manipulating the position,
    in a roll command input method using the control input device, the position includes the second position that operates while moving a position bar up and down and left and right,
    in the roll hold mode, the roll command value in a first range is input by manipulating the second position in a left-right direction,
    in the roll command input method using the control input device, the roll command value in a second range is input by manipulating the second position in the left-right direction and simultaneously pushing or pulling the body portion in the left-right direction, and
    the second range is a value greater than the first range.

3. A command input method using a control input device, as an input method for inputting a heading hold command using the control input device of claim 1, wherein:
    a heading hold mode of the aircraft is performed by selecting the heading hold mode from a monitor showing flight information of the aircraft and inputting a heading command value by manipulating the position,
    the position includes the second position that operates while moving a position bar up and down and left and right, and
    in the heading hold mode, the heading command value in a first range is input by manipulating the second position in the left-right direction,
    in a heading command input method using the control input device, the heading command value in a second range is input by manipulating the second position in a left-right direction and simultaneously pushing or pulling the body portion in the left-right direction, and
    the second range is a value greater than the first range.

4. The command input method of claim 3, wherein:
    in the heading command input method using the control input device, the heading command value in the second range is input by manipulating the second position in a left-right direction and simultaneously twisting the body portion from side to side, instead of pushing or pulling the body portion in the left-right direction.

5. A command input method using a control input device, as an input method for inputting an altitude speed hold command using the control input device of claim 1, wherein;
    an altitude speed hold mode of the aircraft is performed by selecting the altitude speed hold mode from a monitor showing flight information of the aircraft and inputting at least one of an altitude command value or a speed command value by operating the position,
    in an altitude command input method using the control input device, the altitude command value in a second range is input by pushing or pulling the body portion in a front-rear direction, while manipulating the first position in the up-down direction.

6. The command input method of claim 5, wherein:
in the altitude command input method using the control input device, the altitude command value in a first range is input by manipulating the first position in the altitude speed hold mode, and
the second range is a value greater than the first range.

7. The control input device of claim 1, further comprising:
a monitor configured to show flight information of the aircraft, wherein the monitor includes a plurality of modules for automatic flight control to be a touch screen that switches to a selected module when the screen is touched for the module.

8. The command input method of claim 5, wherein:
in a speed command input method using the control input device,
the position includes the second position that operates while moving a position bar up and down and left and right, and
in the altitude speed hold mode, the speed command value in a first range is input by manipulating the second position in the up-down direction.

9. The command input method of claim 8, wherein:
in the speed command input method using the control input device,
the speed command value in a second range is input by manipulating the second position in the up-down direction and simultaneously pushing or pulling the body portion in a forward-backward direction, and
the second range is a value greater than the first range.

* * * * *